Sept. 17, 1963 C. L. WERNER 3,103,750
QUESTION AND ANSWER TEACHING AID
Filed Nov. 1, 1960 3 Sheets-Sheet 1
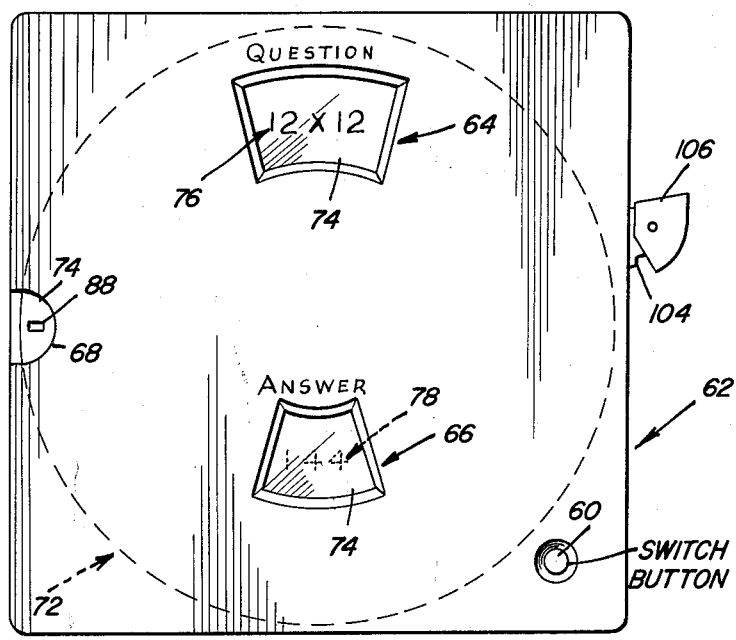
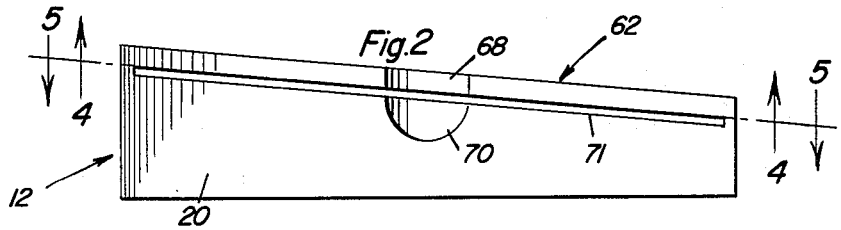
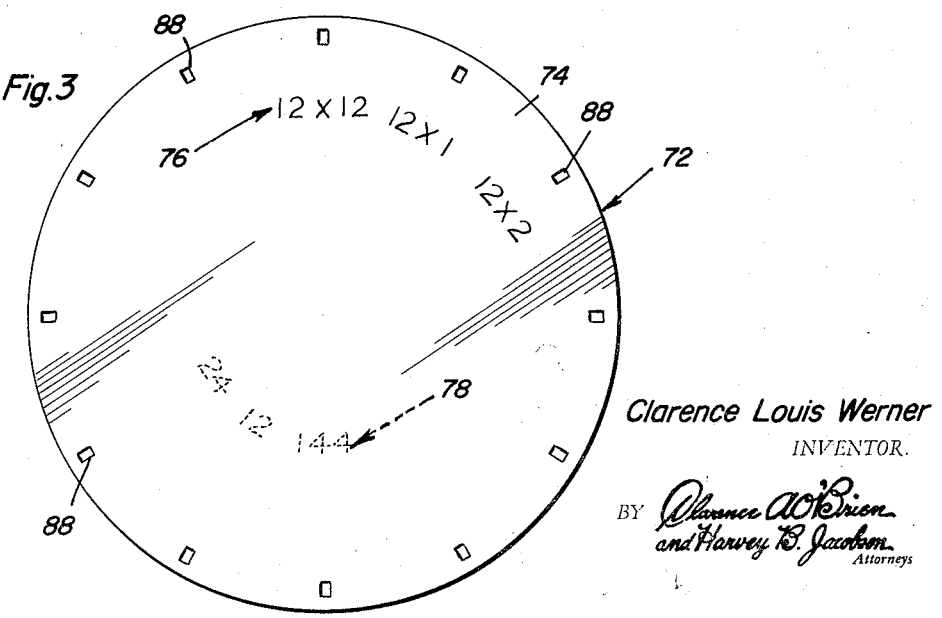
Clarence Louis Werner
INVENTOR.

Sept. 17, 1963  C. L. WERNER  3,103,750
QUESTION AND ANSWER TEACHING AID
Filed Nov. 1, 1960  3 Sheets-Sheet 2
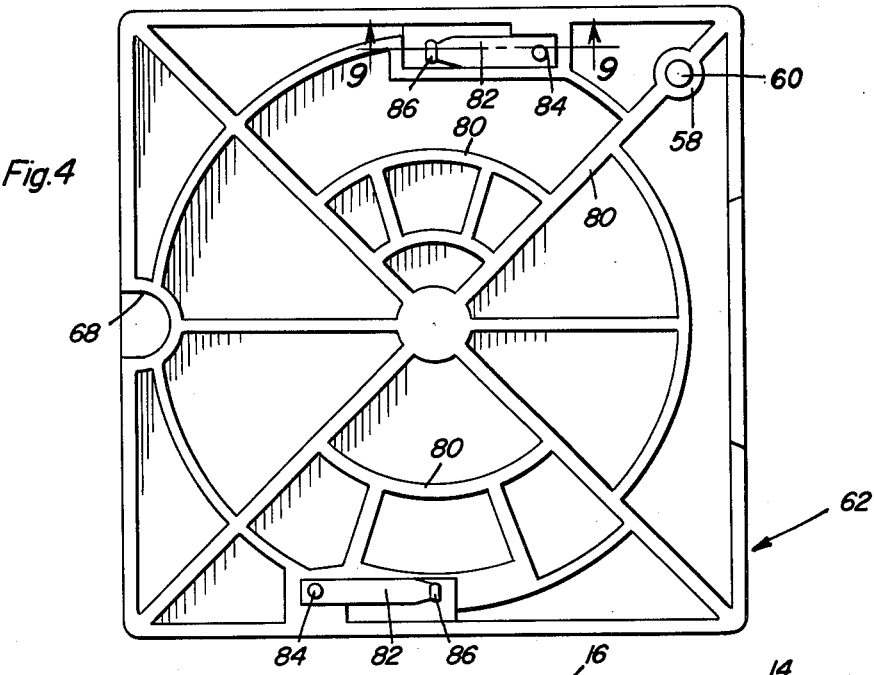
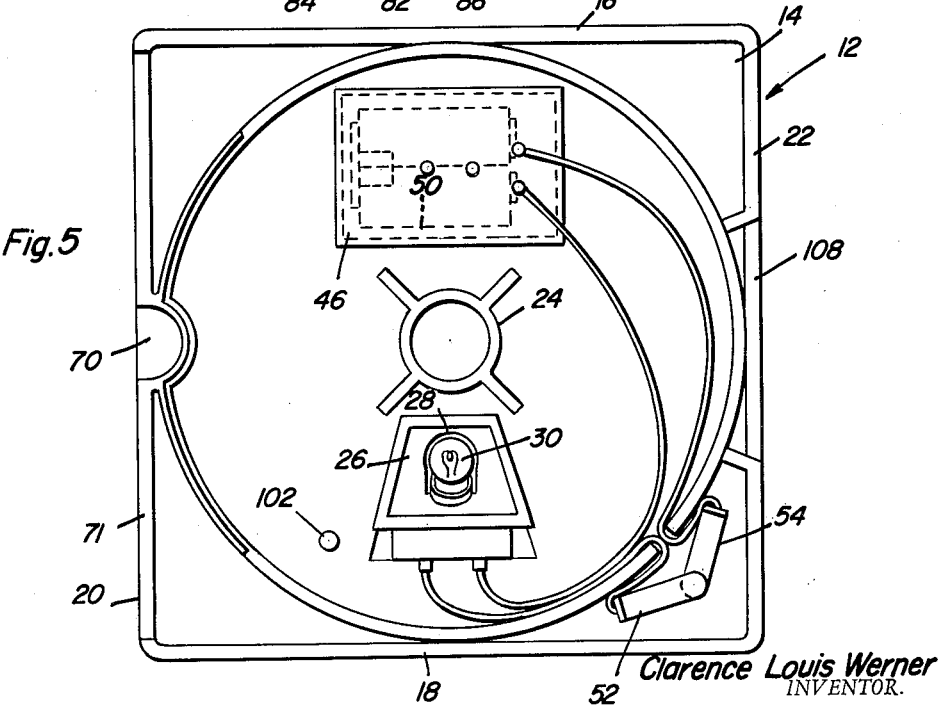
Clarence Louis Werner
INVENTOR.

Sept. 17, 1963 C. L. WERNER 3,103,750
QUESTION AND ANSWER TEACHING AID
Filed Nov. 1, 1960 3 Sheets-Sheet 3
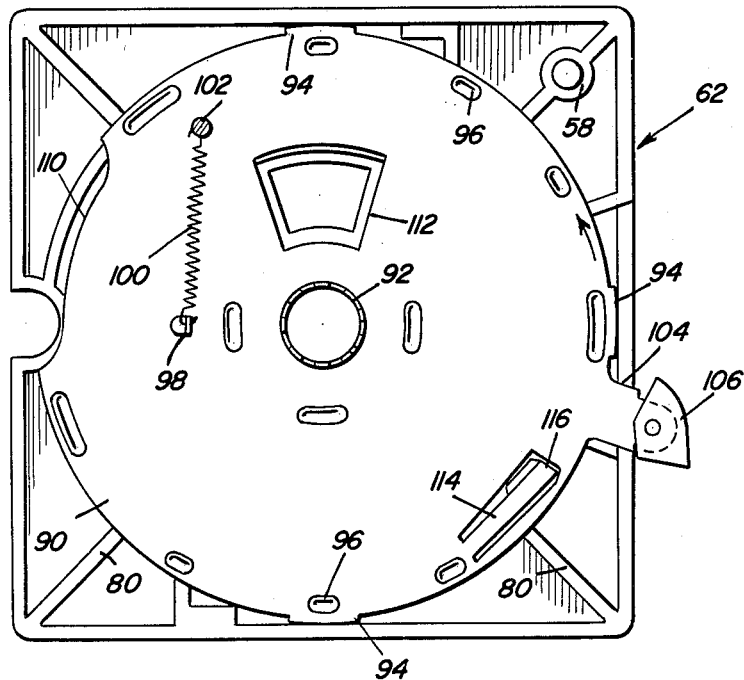
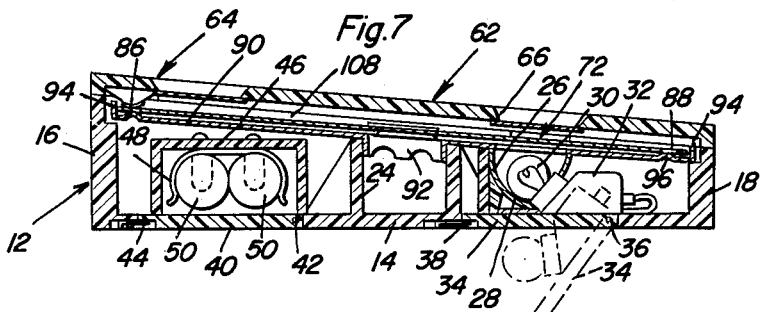
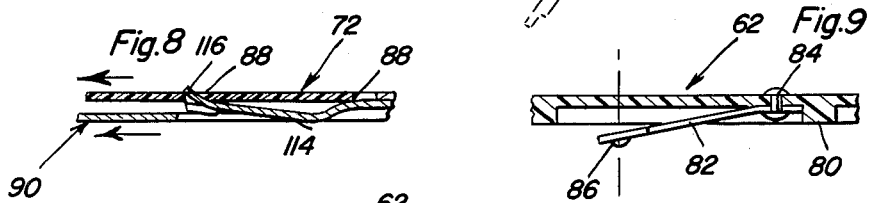
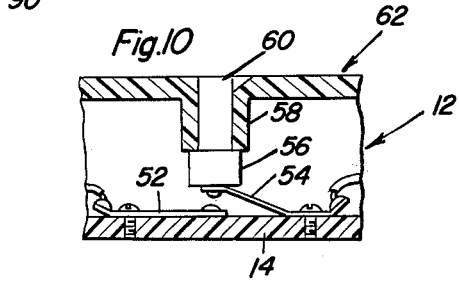
Clarence Louis Werner
INVENTOR.

United States Patent Office 3,103,750
Patented Sept. 17, 1963

3,103,750
QUESTION AND ANSWER TEACHING AID
Clarence Louis Werner, Cleveland, Ohio, assignor of fifty percent to Christine B. Werner, Cleveland, Ohio
Filed Nov. 1, 1960, Ser. No. 66,633
6 Claims. (Cl. 35—9)

This invention relates to portable question and answer games and the like, more particularly, to a structurally novel adaptation embodying means which presents the questions and answers in a unique manner destined to appeal to manufacturers, retailers and users.

In carrying out the invention, interchangeable plastic or equivalent question and answer disks are provided. These disks are inserted by hand through a slot provided therefor in a side wall of a holder, a housing or case, the latter being such that it may be laid on a table for use or simply held in the user's hand. A plurality of these disks are provided and they are preferably made of translucent plastic material having questions on the top face arranged circumferentially in a circular path and answers presented likewise on the bottom face. Clockwise rotation of the disk aligns the questions one-by-one with an upper question display window and simultaneously aligns the desired answer with a bottom diametrically opposite answer window.

One improvement has to do with the normally invisible answers in that, in order to bring the expected or desired answer to view, a source of light is required. To accomplish the desired result, a lamp bulb and complemental reflector is positioned below the answer ring and, by pressing an accessible button and operating a switch, the light comes on and the printed or equivalently displayed answer is reflected and comes to view by way of through the translucent disk in an exciting and eager-to-see manner, much to the amusement of the child or other user.

Another feature allied with the foregoing is the fact that the lamp, small flashlight bulb is readily replaceable. This result is achieved by mounting the bulb in a socket provided on a small hingedly attached bottom door. The upwardly facing parabolic or similar reflector is fixed in the receiver portion of the box-like case or housing and has a radial slot which clears the in and out-swinging bulb. This construction and cooperation of the door, which is latched closed, the bulb and unique reflector has been tried and found to be an excellent solution of this aspect of the over-all problem.

Another improvement has to do with a similar hinged door or lid which affords access through a bottom opening to a clip-equipped holder for pen light dry cell batteries, said holder being fixed in the receiver portion of the case or housing in a convenient and accessibly practical manner.

The housing itself is a further improvement and is novel in other ways. For example, it has a long slot in one side wall (the rim portion) which is so arranged that it allows the interchangeable indicia or question and answer disks to be inserted and removed. When inserted the disk is superimposed on an interiorly mounted discoidal or circular plate. The latter is rotatably mounted and spring biased to assume a given starting position and has a short lever or finger-piece projecting to the exterior by way of another slot which is provided therefor. Catching hold of the lever with the hand and turning the plate, against the tension of the return spring, also turns the disk.

Satisfactory control of the step-by-step action of the disk is accomplished by novel pawl and ratchet means as will be hereinafter revealed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of the improved question an answer teaching aid readied for use.

FIG. 2 is a marginal edge elevation observing FIG. 1 in a direction from left to right.

FIG. 3 is a top plan view of one of the insertable and removable information or question and answer disks.

FIGS. 4 and 5 are sections on the lines 4—4 and 5—5, respectively, of FIG. 2.

FIG. 6 is a bottom plan view of the plate or turntable also showing the bottom plan of the top wall or cover of the housing or case.

FIG. 7 is a central sectional view with parts in elevation illustrating most of the significant component parts.

FIG. 8 is a fragmentary detail section of the disk rotating finger or pawl.

FIG. 9 is a similar sectional view of the top wall or cover showing one of the disk hold-down and ratcheting fingers.

FIG. 10 is a fragmentary sectional and elevational view of the lamp off and on switch.

Considering first the assembled views FIGS. 1, 2 and 7, the holder, broadly construed, comprises a case or housing which is portable and which may be made of suitable moldable material, for example, an appropriate plastic material. Generally speaking, this housing is of box-like form and the box or receiver portion is denoted (FIG. 7) by the numeral 12. It is open at the top and if desired may be reduced in depth from left to right. The generally flat bottom wall is denoted at 14 and the forward marginal wall at 16 and the rearward or inward marginal wall at 18. The left hand side wall (FIG. 2) is denoted at 20 and the right hand side wall is denoted at 22 (FIG. 5). These walls combine in defining the receptacle or receiver portion. Also as seen in FIG. 7 there is a central hollow post or hub at 24 and to the right thereof a suitable mounting is provided for an upwardly facing concavo-convex or parabolic reflector 26 having a slot 28 for clearance of the lamp or bulb 30. This bulb is mounted on a bottom door 34 hinged in place at 36 and covering an opening in the bottom wall corresponding to the shape of the door. A simple slidable latch 38 is used to keep the door closed. This construction is desirable in that the door may be readily opened and closed to replace the bulb. Normally, the bulb is passed through the slot 28 into proper focus relative to the reflector 26. To distinguish from the "door" a similar door 34 at the left is provided and this is referred to as a lid 40, the same being hinged as at 42 and held closed by a simple slidable finger controlled latch 44. This lid covers an opening which registers with an inverted battery box or holder 46. This box is provided with suitable spring clips 48 to retain the replaceable pen-like dry cells or batteries 50. Thus, the bottom 14 has two separately lidded openings to permit ready access to the bulb for changing the same and replacement of the batteries from time to time. These batteries are included in a circuit the wires of which are shown in FIG. 5 and which are connected with the bulb, batteries and also the switch as shown in FIG. 10. With reference to FIG. 10, there is a stationary contact at 52 and a movable contact at 54 which may be operated by a plunger 56 slidable in a guide 58 and having a button 60. This guide 58 is a depending part of the readily applicable and top wall or cover 62 of the housing. This cover may be removably held in place in any suitable manner (not detailed). With further reference to the cover it will be noted that it is provided at the upper side with a sector-shaped window 64 called the question window.

A similar and suitably constructed window 66 is at the lower side and diametrically opposite to the window 64 and constitutes the answer window. With reference now to FIG. 2, it will be seen that the median part of one edge of the cover is provided with a finger notch 68 which registers with a finger recess 70. Also, at this side there is an elongated entrance and exit slot 71 which allows the information member or question and answer disk 72 (FIG. 3) to be inserted and removed.

This disk 72 is preferably constructed from translucent plastic material and the upper surface or side 74 is provided with a ring-like row of printed or equivalently displayed questions denoted generally by the numeral 76. These questions are in what may be called the outer ring. On the bottom and confined to an inner ring will be found the printed or equivalently displayed answers 78. Manifestly, these questions and answers are properly coordinated so that, for example, when the question is as shown in FIG. 1 "12×12" the expected answer diametrically therebelow and in alignment with the window 66 will be "144." With reference again to the bulb or source of illumination, it will be evident that the reflector and bulb underlie the answer ring 78. Normally, these answers are not visible and in order to bring about the desired result it is necessary for the user to depress the button 60 (FIG. 10) whereupon the switch is closed and the circuit is energized to light the bulb and to thus reflect the normally unseen answer 78 through the disk.

With reference now to FIG. 4, which shows a bottom plan view of the cover 62, it will be noted that a plurality or network of ribs 80 are provided. These ribs contact the top surface of the disk 72 so that excessive friction is not present to impede the rotation of the disk. With further reference to FIG. 4 it will be seen that diametrically opposite spring fingers are provided as at 82 and these are duplicates of each other and each has one end portion 84 fixed and the other end portion provided with a suitably shaped retaining tip or head 86. These may be described as pawls and also as hold-down fingers. The tendency of the tension is for the fingers to spring down as shown in FIG. 9 and to rest atop the disk 72. The fingers are, of course, arranged to releasably cooperate with the circumferentially spaced holes 88 in the disk. These same holes are employed for tripping and rotating the disk clockwise.

Attention is now directed to the rotary plate or turntable 90 (FIG. 7) which is elevated and rotatably supported within the confines of the receptacle portion of the housing. This part may be a flat-faced metal plate which is circular or discoidal in plan as shown in FIG. 6 (bottom side). The plate has a central punched out neck 92 which fits down into the hub 24 and thus centers and permits rotation of the plate. The outer marginal edge is provided at circumferentially spaced points with short upstanding arcuate flanges 94 which constitute disk positioning and displacement preventing abutments. When the disk 72 is inserted through the slot 71 it slides across the turntable, the turntable being coplanar with the slot. The abutments 94 assure the disk assuming a properly centered position atop the turntable. Here again, it is desired to reduce frictional contact between the disk and the turntable which is brought out in FIG. 7. This is accomplished by providing the turntable with indentations or embossments which, in turn, define distributed disk elevating bosses 96. The bosses are preferably arranged around the margin of the turntable and underneath the disk turning holes or openings 88. As shown in FIG. 6 the bottom side of the turntable is provided with a struck out ear or lug 98 to which one end of a coiled return spring 100 is connected. The other end of the spring is anchored on a fixed post or the like 102 fixed in the receiver of the housing. This anchored spring is such that it serves to return the turntable to a normal or starting position. Also, as brought out in FIG. 6 in particular, one marginal edge of this turntable is provided with an outstanding member 104 having a finger grip 106 and these components provide a lever which works back and forth in the clearance and limiting slot 108 (FIG. 5) in an obvious manner. There is a clearance notch 110 in the diametrically opposite edge of the turntable as shown in FIG. 6 which cooperates with the slot 71 and celarance or finger niches 68 and 70. Furthermore, there is a sector-shaped opening 112 in the turntable which when the latter is in its normal position registers with the reflector and bulb 26 and 30.

In addition to supporting the disk this turntable also provides the means for imparting step-by-step movement to the disk and this is accomplished by striking out a resilient tongue or finger 114 from the disk and bending it at the desired oblique angle as shown best in FIG. 8. This finger is bent up beneath the disk and the deflected tip or terminal 116 is releasably engageable as a dog or pawl in the successive and alignable openings 88 in the disk.

It will be obvious that by moving the trigger or lever (104 and 106) from the top position seen in FIG. 1 to the bottom position, the turntable is moved one step or approximately 30 degrees and, assuming that the disk 72 is in place as shown in FIG. 7, the pusher finger or pawl 114 and 116 will engage in an adjacent hole or opening 88 and move the disk clockwise. The hold-down fingers 82 with their trippable end portions 88 serve to assist in this turning step and, in fact, they too snap into registrable holes 88 and prevent counterclockwise rotation of the disk.

In practice, an information disk 72 is inserted through the entrance slot 71 and is permitted to reside atop and in alignment with the turntable in the position illustrated in FIG. 7. The turntable is held in its normal or set position by the turn spring 100 as is obvious. Then, by operating the lever or trigger means 104 and 106 as explained, the turntable and also the disk conjointly turn one step at a time. By releasing the lever 104 and 106 the spring returns the turntable to its normal or set position. The hold-down pawls or fingers 82 prevent the retrograde rotation of the disk as explained. Assuming now that the question is 12×12 (FIG. 1) the answer will, of course, appear in the window 66 as 144. However, to attain this result it is necessary to depress the button 60 and to close the switch which lights the bulb and the reflected light brings the normally invisible "144" to view in a seemingly obvious manner.

The manner of obtaining access to the battery holder 46 and the mode of replacing the bulb 30 has already been explained and need not be repeated here.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An educational device comprising a housing having top, bottom, and marginal side walls, said bottom wall being flat and adapted to rest flatwise on a table or the like when in use, said top wall being flat and having a question window and an answer window, one side wall having an elongated slot affording communication with the interior of said housing and for an insertable and removable question and answer member, a plate confined mounted for rotation in said housing beneath the top wall, said plate being in a plane even with said slot and being adapted to support and also turn said member when the latter has been inserted through the slot and seated atop said plate, said plate being spring biased to assume and retain a given normal relatively stationary position and having a lever exposed for use through another slot provided therefor in another side wall of the housing in a manner to turn the plate, and a question and answer member removably seated atop said plate and in alignment with said first named slot, said member comprising a disk having questions and answers thereon selectively registrable with their respective question and answer windows, said slot being of a length greater than the diameter of said disk and said disk having marginally located holes therein circumferentially spaced and related to the individual questions and answers, said plate having a resilient actuating finger providing a pawl and releasably engageable with said holes in a manner to impart step-by-step clockwise movement to said disk.

2. The structure defined in claim 1, and wherein said top wall has minimal portions only in direct contact with the contiguous top side of said disk, said top wall being provided with resilient disk retaining fingers coordinated with said first named finger and also releasably engageable with said holes in a manner to prevent counterclockwise movement of the disk and also to temporarily retain the questions and answers aligned with their intended windows.

3. The structure defined in claim 1, and wherein the underneath interior side of said top wall is provided with resilient retaining fingers coordinated with said first-named finger and also releasably engageable with said holes in a manner to prevent counterclockwise movement of the disk and also to temporarily retain the questions and answers aligned with their intended windows, one window being located in the upper area of the top wall, the other window diametrically opposite thereto in the lower area of said top wall, there being two retaining fingers, one finger aligned with the upper window and the other finger aligned with the lower window.

4. A question and answer teaching device comprising a portable housing embodying an open top box-like receiver having a horizontal bottom wall and upstanding vertical side walls, a removably mounted top wall constituting a closure for the open top, said top wall having a question window in an upper portion thereof and a diametrically opposite answer window in a lower portion thereof, one side wall being provided with a horizontal elongated slot, a plate mounted for rotation on the interior of said housing and parallel to and in close proximity with the underneath side of the top wall and disposed in a plane corresponding with the plane of said slot, said plate constituting a turntable, said plate being provided on the marginal portion thereof with an outstanding lever, said lever extending through and being operable by way of a slot provided therefor in the side wall opposite the first-named side wall, said plate being provided with circumferentially spaced upstanding anti-friction embossments, said plate being further provided with a sight opening normally in alignment with the answer window, spring means connected to the plate and anchored in the housing and serving to maintain the plate in a normally set position, a source of illumination controllably mounted in the housing directly beneath and in alignment with the sight opening in said plate and said answer window, said top wall being provided on its underneath side with resilient disk-retaining fingers, said plate being provided with an upstanding resilient actuating pawl, and the marginal portion of said plate having upstanding circumferentially spaced flanges constituting disk-positioning and retaining abutments.

5. The structure according to claim 4 and in combination, a readily insertable and removable question and answer disk of a diameter slightly less than the length of said slot, said disk residing atop the plate and being elevated from the plate by way of said embossments and marginally held in place and against displacement by said abutments, said disk being made of translucent material and having questions printed on the upwardly facing obverse side and registrable with said question window and having directly viewable and readable answers printed on its reverse side and registrable with said source of illumination, sight opening and answer window said answer being normally hidden from view by the translucent properties of said disk but being brought to view when the illumination is brought into play.

6. A question and answer device comprising a housing embodying a box-like receiver having a flat-bottomed bottom wall and marginal upstanding vertical side walls cooperating therewith, said receiver being open at the top thereof, an applicable and removable top wall mounted atop the side walls and providing a cover for said receiver, said bottom wall being provided at a central portion thereof with an upstanding hub projecting into the receptacle portion of the receiver, said bottom wall having an opening therein at a predetermined place, an upwardly facing parabolic reflector fixed in the receptacle portion of the receiver in alignment with said opening, said reflector having a bulb clearing slot, a latchable accessible door hingedly mounted on said bottom wall and covering and closing said opening, a lamp bulb removably supported on the upper side of said door and swingable through said clearing slot into cooperating relation with the reflector, a circular plate located in the receptacle portion of the receiver, said plate being provided in its central portion with means removably and rotatably connected with said hub, said plate constituting a turntable and being adapted to support an applicable and removable question and answer disk, said plate having a sight opening which is normally registerable with said reflector and also said bulb, said cover having upper and lower windows and said lower window being normally registrable with said sight opening, a coil spring having one end connected with said plate and the other end anchored in said receiver, said plate having an operating lever and being provided with a flexibly resilient actuating finger, said operating lever being operable through a slot provided therefor in a side wall of said receiver, said plate having distributed upwardly extending embossments of limited size circumferentially arranged and providing anti-friction bosses, and marginal edge portions of said plate having circumferentially spaced upstanding flanges providing abutments which assist in positioning and holding the aforementioned disk in place when the latter is being used atop said plate.

References Cited in the file of this patent

UNITED STATES PATENTS

| | | |
|---|---|---|
| 1,673,659 | Anderson | June 12, 1928 |
| 2,178,906 | Haumerson | Nov. 7, 1939 |
| 2,496,767 | Zuercher | Feb. 7, 1950 |
| 2,540,872 | Fliescher | Feb. 6, 1951 |
| 2,570,652 | Dilks | Oct. 9, 1951 |
| 2,764,911 | Smith | Oct. 2, 1956 |
| 2,789,205 | Schwartz | Apr. 16, 1957 |
| 2,864,938 | Shaw | Dec. 16, 1958 |
| 2,871,577 | Davis | Feb. 3, 1959 |
| 2,916,964 | Paulsohn | Dec. 15, 1959 |